United States Patent
Swanburg et al.

(10) Patent No.: US 8,856,177 B2
(45) Date of Patent: *Oct. 7, 2014

(54) PERSONAL PROFILE DATA REPOSITORY

(71) Applicant: AT&T Mobility II LLC, Atlanta, GA (US)

(72) Inventors: Scott Allen Swanburg, Duluth, GA (US); James Partrick Ryan, Roswell, GA (US); Jeffrey Clinton Mikan, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/872,270

(22) Filed: Apr. 29, 2013

(65) Prior Publication Data

US 2013/0238661 A1    Sep. 12, 2013

Related U.S. Application Data

(63) Continuation of application No. 11/514,127, filed on Sep. 1, 2006, now Pat. No. 8,433,726.

(51) Int. Cl.
*G06F 7/00* (2006.01)
*G06F 17/30* (2006.01)
*G06F 21/60* (2013.01)
*G06Q 30/02* (2012.01)

(52) U.S. Cl.
CPC .......... *G06F 17/30893* (2013.01); *G06F 21/60* (2013.01); *G06Q 30/02* (2013.01); *G06F 17/30117* (2013.01)
USPC .......................................................... 707/783

(58) Field of Classification Search
CPC ... G06F 17/20117; G06F 21/60; G06F 21/62; G06Q 30/0601
See application file for complete search history.

(56) References Cited

U.S. PATENT DOCUMENTS

| | | |
|---|---|---|
| 5,774,650 A | 6/1998 | Chapman et al. |
| 6,532,459 B1 | 3/2003 | Berson |
| 7,103,606 B2 | 9/2006 | Brown et al. |
| 8,175,908 B1 | 5/2012 | Anderson |
| 2002/0046163 A1 | 4/2002 | Shahidi |
| 2002/0091650 A1 | 7/2002 | Ellis |
| 2002/0143961 A1 | 10/2002 | Siegel et al. |
| 2002/0152278 A1 | 10/2002 | Pontenzone et al. |
| 2003/0009465 A1 | 1/2003 | Brown et al. |
| 2003/0074456 A1 | 4/2003 | Yeung et al. |
| 2003/0097451 A1 | 5/2003 | Bjorksten et al. |
| 2003/0163427 A1 | 8/2003 | Fung et al. |
| 2003/0163483 A1 | 8/2003 | Zingher et al. |
| 2004/0054572 A1 | 3/2004 | Oldale et al. |
| 2005/0198037 A1 | 9/2005 | Berman et al. |
| 2006/0085270 A1 | 4/2006 | Ruckart |
| 2006/0111991 A1 | 5/2006 | Wilshinsky et al. |
| 2006/0136306 A1 | 6/2006 | Rothman et al. |
| 2008/0000964 A1 | 1/2008 | Flake et al. |

OTHER PUBLICATIONS

International Search Report dated Jan. 28, 2008 in International Application No. PCT/US2007/077475.

(Continued)

*Primary Examiner* — Jeffrey A Burke
(74) *Attorney, Agent, or Firm* — Hartman & Citrin LLC

(57) ABSTRACT

A personal profile data repository is disclosed. The personal profile data repository stores information about a user. The user has complete control over the content of the profile and over what third parties may access information stored in the repository.

20 Claims, 5 Drawing Sheets

(56) References Cited

OTHER PUBLICATIONS

U.S. Office Action dated Apr. 16, 2008 in U.S. Appl. No. 11/514,127.
U.S. Office Action dated Oct. 6, 2008 in U.S. Appl. No. 11/514,127.
U.S. Office Action dated Jun. 3, 2009 in U.S. Appl. No. 11/514,127.
U.S. Office Action dated Oct. 22, 2009 in U.S. Appl. No. 11/514,127.
U.S. Office Action dated Mar. 16, 2010 in U.S. Appl. No. 11/514,127.
U.S. Office Action dated Jun. 23, 2010 in U.S. Appl. No. 11/514,127.
U.S. Office Action dated Sep. 13, 2010 in U.S. Appl. No. 11/514,127.
U.S. Office Action dated Dec. 17, 2010 in U.S. Appl. No. 11/514,127.
U.S. Office Action dated Mar. 4, 2011 in U.S. Appl. No. 11/514,127.
U.S. Office Action dated Aug. 9, 2012 in U.S. Appl. No. 11/514,127.
U.S. Notice of Allowance dated Dec. 17, 2012 in U.S. Appl. No. 11/514,127.

PERSONAL PROFILE DATA REPOSITORY

CROSS-REFERENCE TO RELATED APPLICATIONS

The present application is a continuation of U.S. patent application Ser. No. 11/514,127, filed Sep. 1, 2006, now U.S. Pat. No. 8,433,726, titled "Personal Profile Data Repository," which is incorporated herein by reference in its entirety.

BACKGROUND OF THE INVENTION

1. Field of the Invention

The present invention relates to data collection over networks. More particularly, the present invention relates to techniques for tracking information of individuals.

2. Background of the Invention

The advent of the electronic era has made it much easier for people to transact business and conduct their affairs. People can now obtain nearly anything they need online, from books and music to groceries. Laborious, time-intensive tasks, such as applying for mortgages and student loans, can now be done with a simple click of the mouse. Employers and employees can submit timecards and perform other payroll activities online. Electronic mail, instant messaging, and video-conferencing have made communication easier and faster than ever before.

However, the electronic age is not without its drawbacks. Every time a customer uses a credit card to order a product over the Internet, the user's credit card number is stored in the online seller's database. This database may also contain other personal information, such as the customer's name and address. Other databases may include more sensitive data, such as a social security number or information about a customer's financial holdings. The number of databases containing the user's personal information increases every time a user conducts business with a third party. Eventually, the user will lose track of who has what information about the user.

The proliferation of personal information in multiple databases results in users losing control of their own personal information. The likelihood of a security breach involving the user's personal information increases with the number of databases storing that information. Front page headlines have exposed breaches of commercial databases that resulted in the theft of thousands of credit card numbers and other personal information.

In addition to theft, the user's loss of control over his personal information manifests itself in other ways. Several companies use the personal information stored in their database to create marketing lists of customers using the customer's names, addresses, and electronic mail addresses. If a customer has engaged in repeat business with the company, the company may also be able to correlate the customer with one or more interests. Once a company has compiled such a marketing list, the company could sell the list to telemarketers. A marketing list can often become a company's most valuable asset. The user has little control over the company's use of his personal information.

The consumer's loss of control over his personal information can have more dangerous consequences as well. The easy accessibility of personal information makes it easy for private investigators and stalkers to gain access to information about the user's whereabouts, such as his home address or telephone number. The private investigator or stalker could then use the information to spy on the consumer or physically or verbally harass him.

Recently, several efforts have been made to curtail the problem of proliferating personal information. Legislation has been passed, or proposed, to limit the ability of companies to sell their marketing lists to others. Laws against "identity theft" have been strengthened. Consumer protection laws now provide greater protection and reduced liability to consumers in the event of fraud. However, these efforts are stopgaps. They address the symptoms of the problem, not the cause.

One important issue is the user's lack of control over his own personal information. Because the user does not control the dissemination of his personal information, others are free to do whatever they want with that personal information, such as store it in insecure databases or sell it to unscrupulous telemarketers. The user, who cannot control his own personal information, has few options other than to appeal to the political or legal process, which is often slow and cumbersome. Further, since companies often have impressive lobbying capabilities, consumer protection advocates are often at a disadvantage in the political world, where they run up against the political clout of the marketing companies and other special interests. Similarly, if a user files a lawsuit, he must contend with a well-financed team of attorneys.

What is needed, therefore, is a way in which users can control access to their own personal information with minimal fear of the loss or personal information to third parties or such dissemination between groups that have no prior right to possess or control such information.

SUMMARY OF THE INVENTION

The present state of affairs regarding a user's personal information is inconvenient and poses potential for great liability on the part of the user. Presently, a user has little or no control over the dissemination of his personal information. This leads to the personal information being used for purposes contrary to the user's interest. The personal information can be sold to marketing firms, stolen and used for identity theft (subjecting him to liability for fraudulent purchases, as well as the hassle of correcting a tainted credit record), or used by stalkers to harass and potentially injure the user. The present invention reduces the impact and likelihood of these problems by placing control of a user's personal information in the hands of the user.

In one exemplary embodiment, the present invention is a personal profile data repository. The personal profile data repository includes an information gathering component. The information gathering component gathers information about a user in one location under the user's control. The personal profile data repository also includes a profile storing component. The profile storing component stores the information gathered by the information gathering profile as a profile of the user. A security component grants unlimited access to the profile only to the user and limited access to third parties designated by the user.

In another exemplary embodiment, the present invention is a personal profile data repository. An information gathering component gathers information about a user in one location under the user's control. The information gathering component also correlates the information into a plurality of categories. A profile storing component stores the information as a profile of the user based on the plurality of categories. A security component grants only limited access to third parties designated by the user. The user may designate the amount of access enjoyed by the third party.

DETAILED DESCRIPTION OF THE INVENTION

The present invention provides for a personal profile data repository that puts the user in control of his own personal information. The user may dictate what type of information is accessible and who may access the personal information. In the embodiments described below, the present invention is discussed with respect to a variety of networks and applications. However, the present invention may be used with any type of network and any type of application. Similarly, the personal profile data repository may be stored in any fashion and in any location such that the user may exercise control over the information stored in the personal profile data repository. It could, for example, be stored in a separate device or as part of another device, such as a personal computer, network server, or modem. The personal profile data repository could also be stored at a user's home or in another location, such as an Internet Service Provider (ISP) or other service provider.

Figure 1:
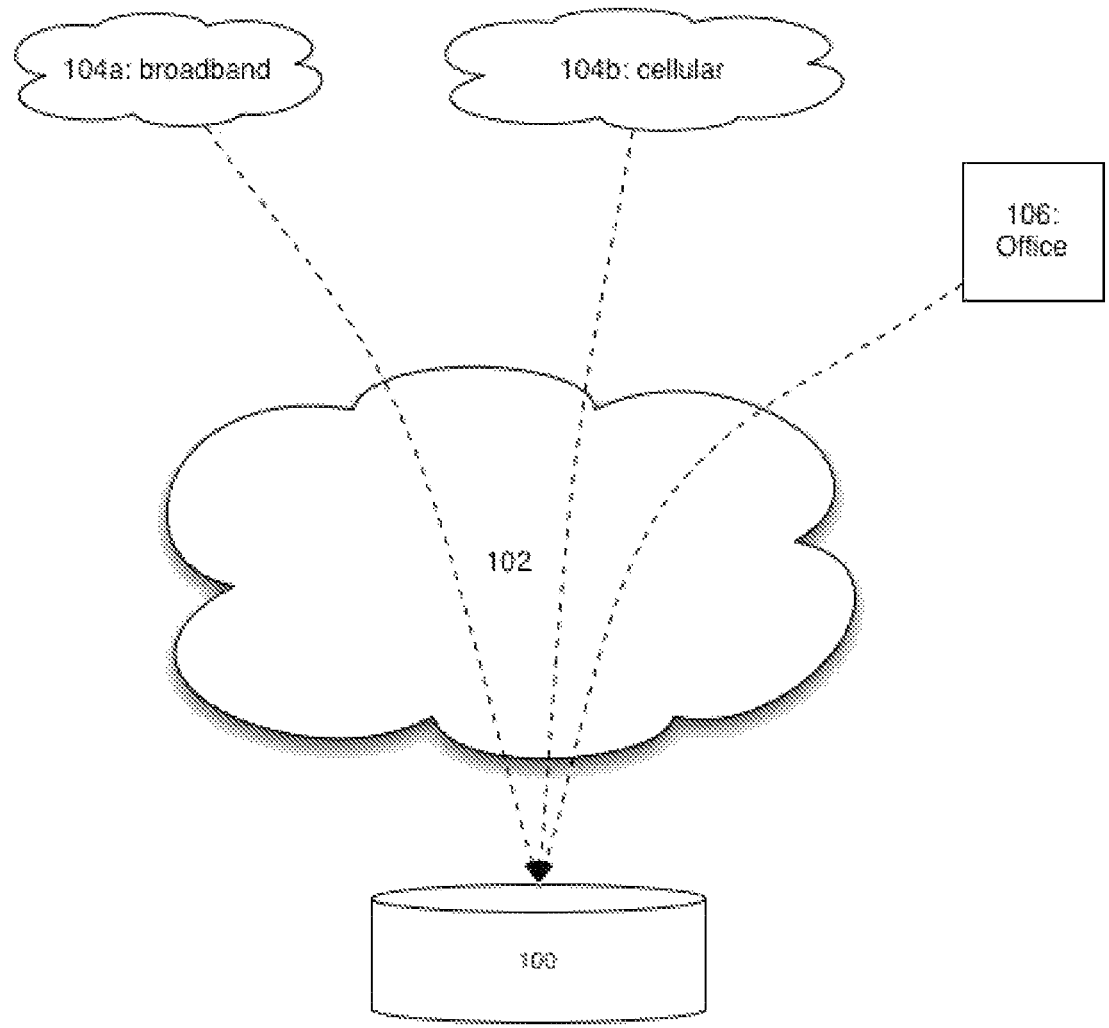
FIG. 1 shows a view of a plurality of applications and networks communicating with the present invention through the Internet.

FIG. 1 shows an overview of an exemplary environment in which the present invention may be used. The personal profile data repository 100 collects information about the user from a variety of sources. These sources can come from any application on any network. Thus, personal profile data repository 100 may collect information from applications or entities on broadband network 104a. At the same time, personal profile data repository 100 can collect information from applications or entities on cellular network 104b. The personal profile data repository may collect information from entities located on any network, such as information stored at the office 106, connected to personal profile data repository 100 via the Internet 102. Personal profile data repository 100 may store the information it gathers in a secure access database fully accessible only to the user. Third party access to the information in the secure access database would be limited. The user would be able to designate which third parties may access the information and what information those third parties would be entitled to access.

As shown in FIG. 1, personal profile data repository 100 may communicate with services, applications, or entities running on any kind of network. Data can be collected from services, applications, or entities running on broadband network 104a or cellular network 104b. Personal profile data repository 100 can also collect data from services, applications, or entities running on networks not shown in FIG. 1, such as local area networks, wide area networks, wireless networks, or home networks. Data may be collected electronically or non-electronically. For example, a user could manually enter some information (such as his name and address) into personal profile data repository 100.

An end result of data collection is that all personal information about the user, regardless of the source or source's location, is "pushed" to the personal profile data repository 100. The final location of the data, the personal profile data repository 100, is under the user's control. The user is now the sole holder of his personal information and can control who has access to it and when.

Since the personal profile data repository collects data from applications, services, and entities regardless of where they are or what network they are on, the personal profile data repository 100 may be located in any convenient place. The personal profile data repository 100 could be located in the user's home or similar place where it is physically accessible to the user. The personal profile data repository 100 could also be stored in a more central location, such as at an Internet Service Provider (ISP) or other service provider. So long as the user has full access to the information stored on the personal profile data repository 100 and the ability to control access to the information by third parties, the personal profile data repository 100 may be stored anywhere.

Figure 2:
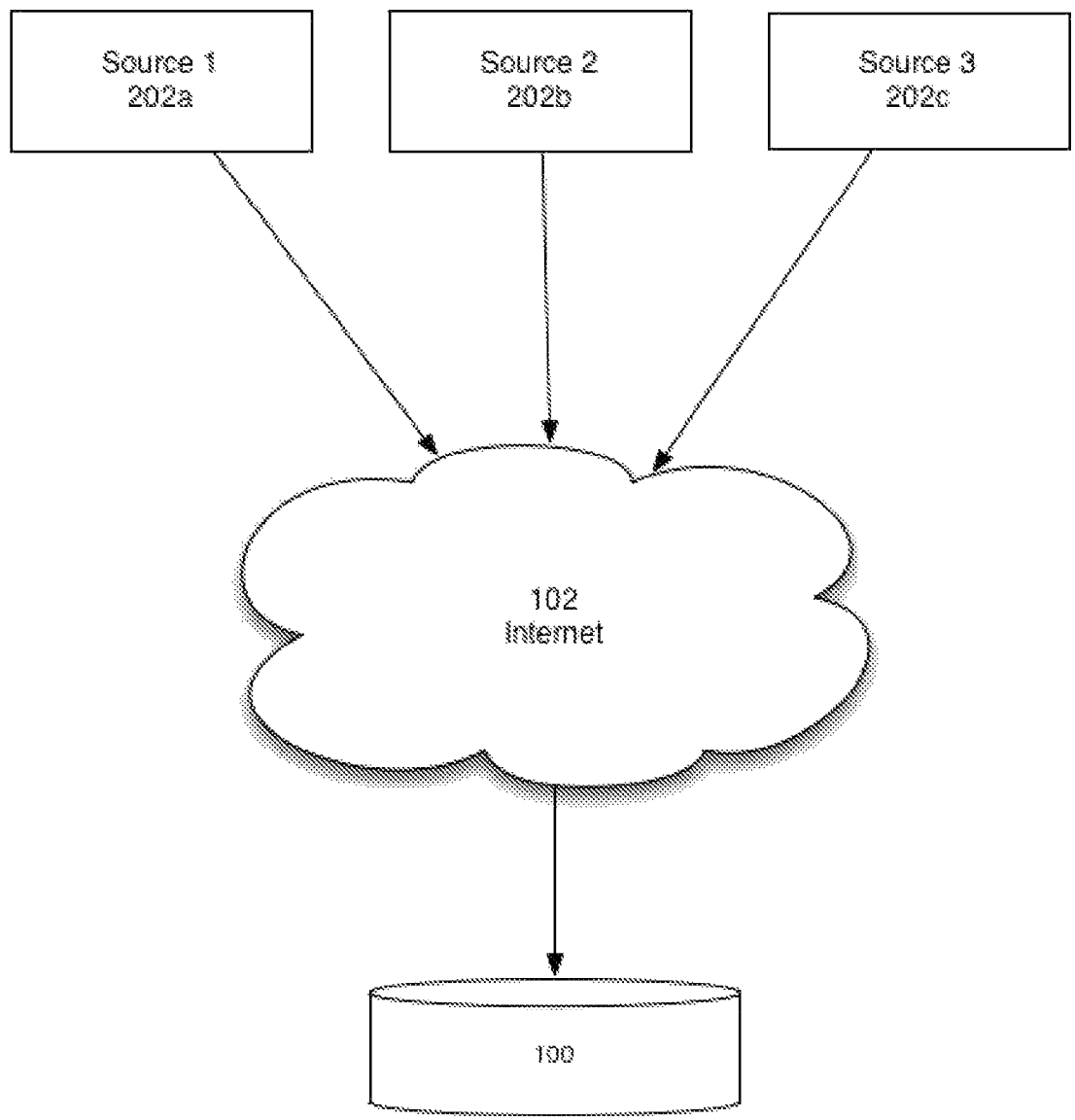
FIG. 2 shows a view of a plurality of information sources transferring information about the user to the present invention.

FIG. 2 shows an exemplary embodiment of the present invention. Sources 202a, 202b, and 202c transmit information about a user to the user's personal profile data repository 100. Personal profile data repository 100 takes the information and stores it as a profile in the personal profile data repository 100. Once the personal profile data repository 100 receives information from sources 202a, 202b, and 202c, the information is deleted from any databases owned by the respective source. In this fashion no copy of information about a user exists outside the user's personal profile data repository 100. Alternatively, the respective source may only access information stored in a memory space allocated specifically for that designated outside source. Thus, the outside source cannot obtain or access information other than what it is intended to obtain or access.

The information sent to personal profile data repository 100 by sources 202a, 202b, and 202c could be any type of information about the user of personal profile data repository 100. The information could be collected in any fashion. For example, the information could be event (transaction) information generated by the user's interaction with source 202a. Once the transaction is completed, source 202a sends the transaction information to the personal profile data repository 100 for storage in the user's profile. The personal profile data repository could also monitor any applications that the user is using and store the information collected by the monitoring into the user's profile.

For example, source 202a could be an online shopping site. Every time the user orders an item from the site, the site generates information about the user. This information could include the user's credit card number, the billing address, the shipping address (including information about the recipient of the order, if it is not the user himself), and the items ordered. Once the user completes the transaction, the online shopping site 202a sends the information to the personal profile data repository 100, where the information becomes part of the user's profile. The online shopping site 202a then deletes the information from its own databases, to the extent that is possible. Online shopping site 202a may need to retain some amount of information for inventory purposes or to satisfy any relevant laws or regulations. However, if online shopping site 202a does need to retain some amount of information, it can be modified so that it does not identify the user. In this fashion the user retains maximum control of his personal information. Alternatively, the online shopping site 202a may only have access to a portion of the personal profile data repository 100 that has credit card information necessary for the transaction, and such information is permanently stored in the personal profile data repository 100 and not on the online shopping site 202a.

In another example of the present invention, source 202b could be the web site of a major local newspaper. The personal profile data repository 100 monitors the user's interactions with the newspaper website 202b. Over time, the personal profile data repository notices that the user often accesses web site 202b to read articles on the Washington Nationals. The personal profile data repository 100 can then conclude that the user is interested in the Washington Nationals and store that information in the user's profile.

Figure 3:
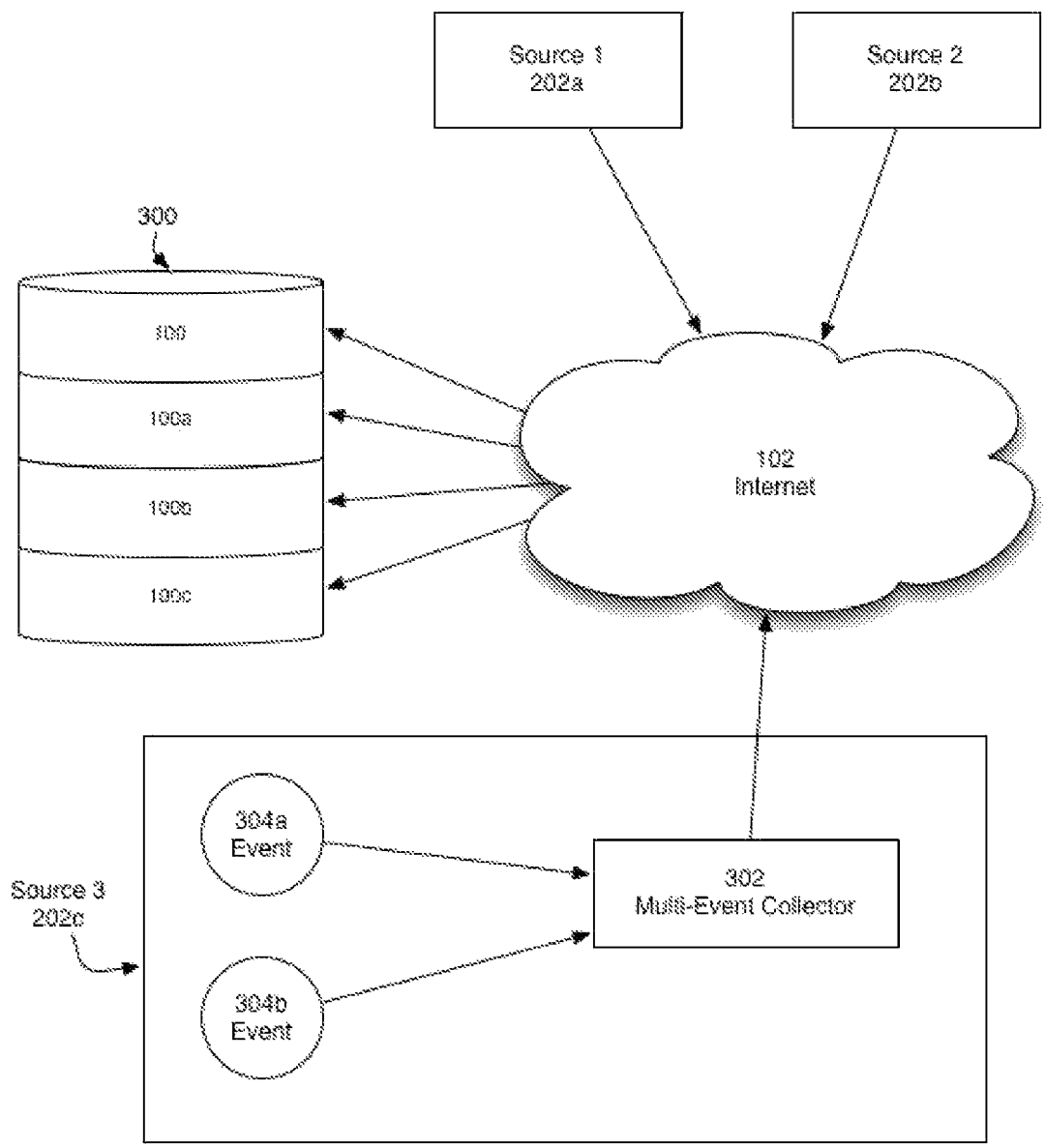
FIG. 3 shows a view of a plurality of information sources communicating with the present invention over the internet.

FIG. 3 shows another exemplary embodiment of the present invention. FIG. 3 shows a personal profile data repository bank 300, including a plurality of personal profile data repositories 100, 100a, 100b, and 100c. Each personal profile data repository 100, 100a, 100b, and 100c is logically separate from the others. The personal profile data repositories 100, 100a, 100b, and 100c may or may not be physically separate from the others as well. Personal profile data repository bank 300 could be located in a central location, such as an Internet Service Provider (ISP) or other service provider.

Personal profile data repositories 100, 100a, 100b, and 100c could also be located in individual users' homes or in another place physically accessible by the users. In this situation, the personal profile data repositories could appear to sources 202a, 202b, and 202c as part of one personal profile data repository bank 300. However, in reality, the personal profile data repositories 100, 100a, 100b, and 100c would be in different physical locations.

FIG. 3 also shows an expanded view of source 202c. Although only source 202c is shown in this expanded view, the components described with respect to source 202c may also be present in sources 202a and 202b. Source 202c contains multi-event collector 302. Multi-event collector 302 collects events 304a and 304b prior to sending them to personal profile data repository 100 or personal data repository bank 300.

Multi-event collector 302, shown in FIG. 3, may be used in situations where sending events 304a and 304b one at a time is not practical. This may occur where the number of events 304a and 304b is very large or when Internet 102 is highly congested. A user who engages in a large number of transactions (events) over a short period of time may generate a large number of events 304a and 304b. Source 202c may not want to transmit these events to personal profile data repository 100 one at a time, perhaps to avoid excess use of bandwidth or processing time. Instead, multi-event collector 302 collects events 304a and 304b and transmits them later, once the user has finished transacting with source 202c and no more events are generated.

Similarly, source 202c can use multi-event collector 302 when Internet 102 is congested or source 202c is encountering an abnormally high amount of traffic. In these situations, sending events 304a and 304b to personal profile data repository 100 increases the congestion and traffic, limiting the ability of customers to access source 202c. To alleviate this problem, multi-event collector 300 can collect events as they are generated. Once the congestion has ceased or traffic has died down, multi-event collector 300 transmits the events to personal profile data repository 100. These uses of multi-event collector 300 are merely exemplary; source 202c may utilize multi-event collector 300 for these purposes or for any other purpose.

The concentration of a user's personal information in personal profile data repository 100 is one aspect of the present invention. Another aspect of the present invention is the user's ability to control what third parties may access to the information and what information those third parties may have access to. This aspect is represented by another exemplary embodiment, shown in FIG. 4.

Figure 4:
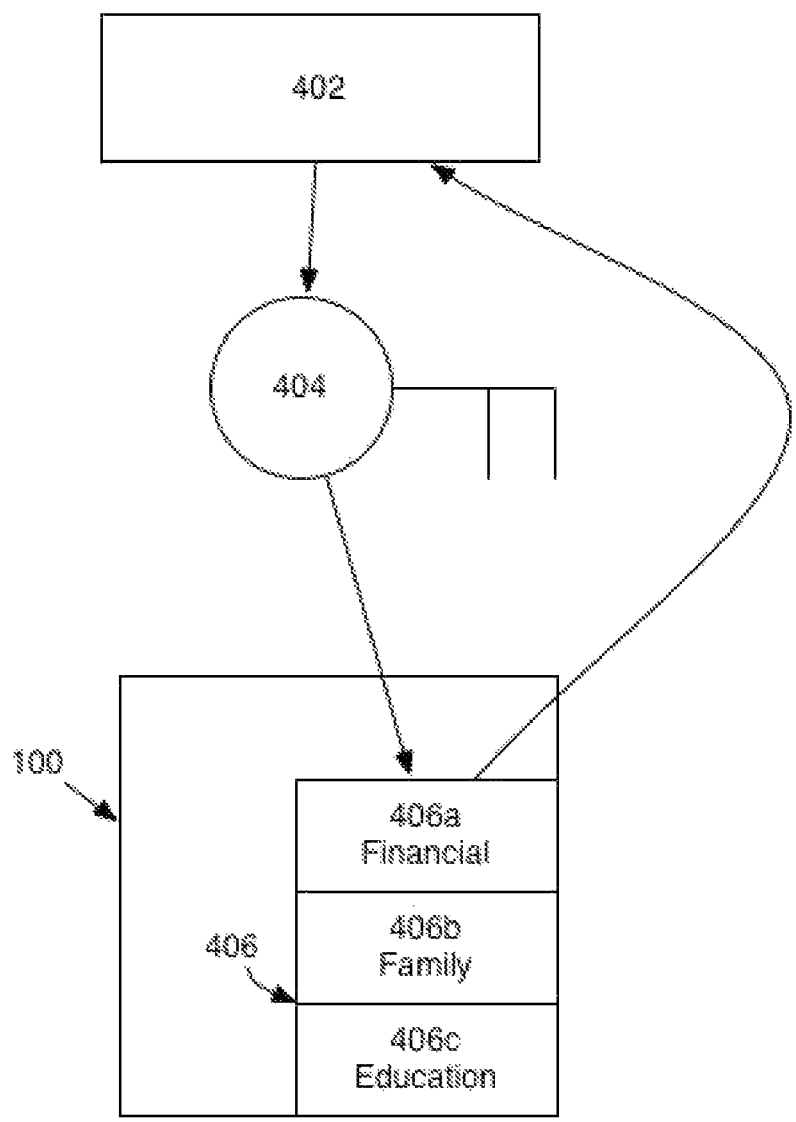
FIG. 4 shows another view of a plurality of information sources communicating with an embodiment of the present invention over the Internet, with one of the information sources being expanded to show greater detail.

FIG. 4 shows personal profile data repository 100. Personal profile data repository 100 contains profile 406. Profile 406 can be a secure access database containing all the personal information about the user which personal profile data repository 100 has collected. The information stored in profile 406 is stored in various categories 406a, 406b, and 406c. Categories 406a, 406b, and 406c represent different views of the information stored in profile 406. Information could be stored in one or more categories if the information is relevant to those categories. FIG. 4 shows three exemplary categories of information: Financial (406a), for a user's financial information; Family (406b), for information about a user's family; and Education (406c), for information about a user's education. Information pertaining to the user's student loans could be classified under both Education (406c) and Financial (406a), since it relates to both categories. Similarly, information pertaining to the number of dependents in the user's household could be classified as both Financial (406a) and Family (406b), since the number of dependents relates to the user's family and is also useful for tax purposes. The number and type of categories shown in FIG. 4 is merely exemplary; the personal profile data repository of the present could have any number of categories of any type.

The personal profile data repository 100 may generate categories 406a, 406b, and 406c in any number of ways. Personal profile data repository 100 could have certain categories of information "pre-set". Personal profile data repository 100 could generate categories "on the fly" as it collects information, using known techniques for classifying data. The user could also generate his own categories. These techniques are exemplary; the personal profile data repository according to the present invention may use these techniques or any other technique known in the art for generating categories 406a, 406b, 406c and classifying information as belonging to one or more categories.

The user of personal profile data repository 100 can use the categories 406a, 406b, and 406c to grant third parties, such as third party 402, limited access to the information stored in profile 406. This limited access could be obtained through the use of Virtual Access Key 404. If a third party wishes to have access to information stored in profile 406, the user may give the third party 402 a virtual access key 404 granting access to the information classified in one or more categories 406a, 406b, or 406c. Third party 402 then presents the virtual access key 404 to personal profile data repository 100. Once personal profile data repository 100 authenticates virtual access key, third party 402 may access the particular category of information specified in virtual access key 404. The authentication process could be any authentication technique known in the art. When third party 402 no longer requires access to information stored in profile 406, any copies of the information not stored in personal profile data repository 100 are deleted. In this fashion third parties are granted access only to the information they require and the information is kept secure and under the user's control.

For example, third party 402 may be a mortgage lender considering extending a mortgage offer to the user of personal profile data repository 100. The user gives the mortgage lender 402 a virtual access key granting the mortgage lender 402 access to the information stored in the Financial category 406a of profile 406. When the mortgage lender is ready to review the necessary information, the mortgage lender 402 presents virtual access key 404 to personal profile data repository 100. Personal profile data repository then authenticates virtual access key 404. If virtual access key 404 is authentic, personal profile data repository 100 permits the mortgage lender 402 to view the information in Financial category 406a. Once the mortgage lender no longer requires access, the virtual access key 404 is deleted and any information about the user not stored in personal profile data repository 100 is deleted as well.

In addition to virtual access key 404, other security techniques could be employed to increase the security of profile 406. Profile 406 could be encrypted using known encryption techniques. In this case, virtual access key would contain a decryption key allowing decryption of a particular category 406a of information stored in profile 406. Other security techniques known in the art, in addition to encryptions, could also be used to secure profile 406.

Figure 5:
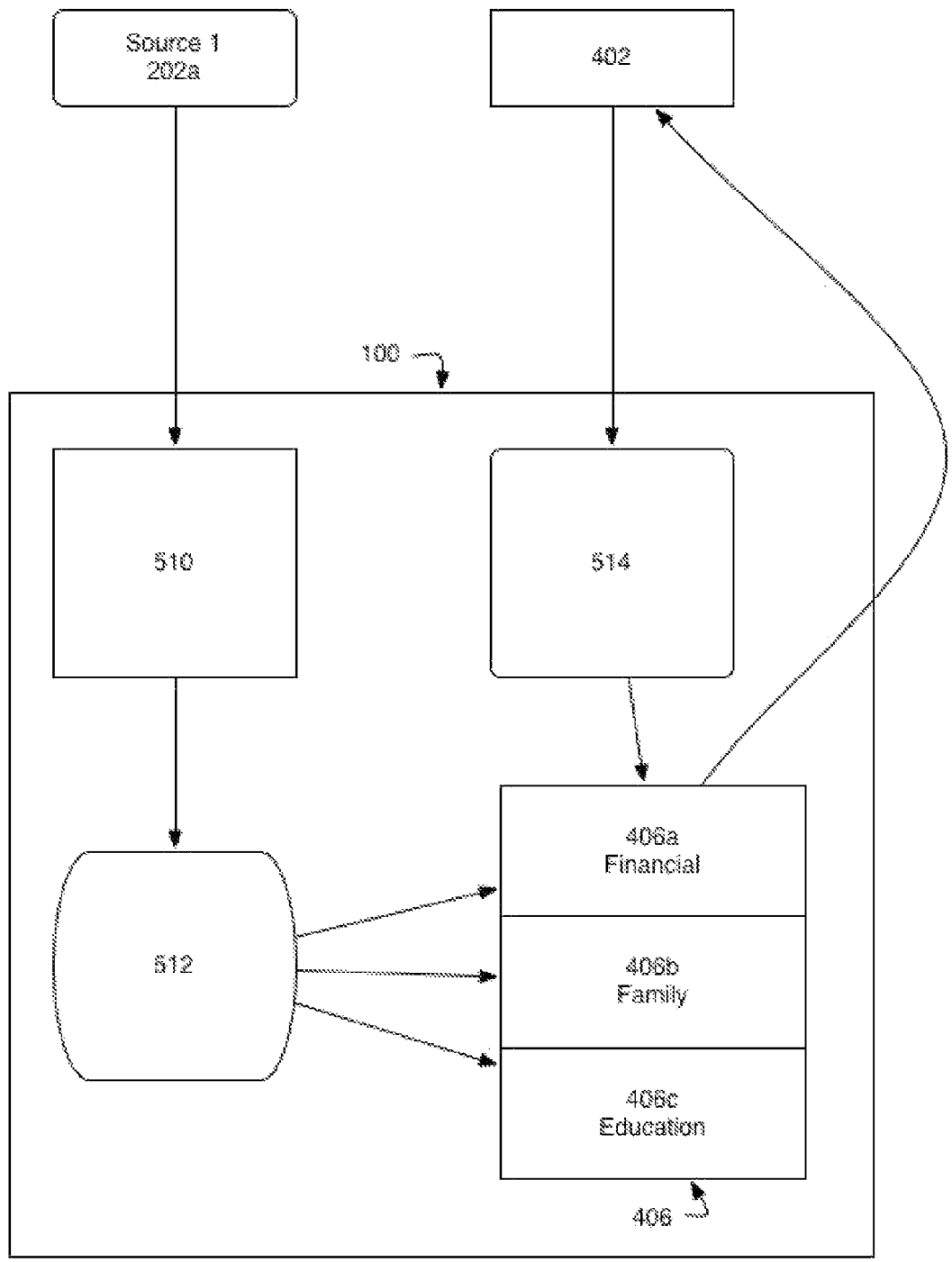
FIG. 5 shows an expanded view of one exemplary embodiment of the personal profile data repository according to the present invention.

FIG. 5 shows an expanded view of personal profile data repository 100. In another exemplary embodiment, personal profile data repository contains information gathering component 510, profile storing component 512, and security component 514. Information gathering component 510 gathers information about the user of personal profile data repository 100. Profile storing component 512 stores the information gathered by the information gathering component 510 into profile 406. Security component 514 controls access to profile 406 by third parties.

Information gathering component 510 gathers information about the user of personal profile data repository 100. Information gathering component collects information about the user from sources such as source 202a. This information may be obtained in any number of ways. Source 202a could push the information to information gathering component 510. This information can be events (transactions), such as event 304a and 304b (shown in FIG. 3). Information gathering component 510 could also monitor the user's interactions with source 202a. Based on this monitoring, information gathering component can draw conclusions about the user. Those conclusions can then be stored in profile 406 by profile storing component 512.

Profile storing component 512 takes the information collected by information gathering component 510 and stores it into profile 406. If information gathering component 510 has not classified the information into categories 406a, 406b, and/or 406c, profile storing component may correlate the information into the relevant categories before storing the information in profile 406. The profile storing component 512 (or information gathering component 510) may perform the correlation using any technique for classifying information.

Information gathering component 510 and profile storing component 512 are shown in FIG. 5 as part of personal profile data repository 100. However, these components may be stored in any convenient location. For example, personal profile data repository 100 may be located in the user's home, possibly connected directly to the user's modem (or other device used to connect to the Internet 102 shown in FIG. 1). However, one or more of information gathering component 510 and profile storing component 512 may be stored in a network server. This network server could be located at an Internet Service Provider (ISP) or other service provider.

In another exemplary embodiment, information gathering component 510 could be stored in a computer-readable medium on a network server operated by an ISP. The profile storing component 512 is stored in a computer-readable medium on personal profile data repository 100. Personal profile data repository 100 is located in the user's home. Information gathering component collects information about the user from sources such as source 202a. Information gathering component may (or may not) classify the information it collects into one or more categories 406a, 406b, and 406c. Information gathering component 510 then sends the information to the profile storing component 512. If information gathering component 510 did not classify the information into categories, profile storing component 512 performs this task. Either way, profile storing component stores the information sent to it into profile 100.

FIG. 5 also shows security component 514. Security component 514 manages access to profile 100. Only the user has unrestricted access to profile 100. Third parties, such as third party 402, have only limited access to the information stored in profile 100. Users may designate what information a particular third party 402 may have access to. Security component 514 can manage access to profile 100 by third party 402 using techniques such as the virtual access key 404 described above with respect to FIG. 4.

Security component 514 is shown in FIG. 5 as being separate from profile 100. In another exemplary embodiment, security component 514 is a virtual safety deposit box. In this embodiment, profile 100 is stored within security component 514, just like a user might store important documents in a conventional bank safety deposit box. Profile 100 may be stored as a secure access database. The virtual safety deposit box includes the top level of the database, controlling access to the other layers comprising the profile 100. Other techniques for maintaining the security of profile 100 may be used as well. Regardless of what technique is employed, the virtual safety deposit box controls access by third party 402 to profile 100. In this fashion the user maintains control over his personal information. Only the user has unlimited access to the information, and the only copy of the information resides in the personal profile data system 100. Because the user controls access to the only copy of his personal information, the possibility of the information being misused is significantly reduced.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A personal profile data repository, comprising components stored on a non-transitory computer-readable medium, the personal profile data repository comprising:
an information gathering component for gathering information from a database of an online shopping site into one location under the user's control including receiving the information from third parties and classifying the information by usage and type, the information including a user's name, a credit card number, an address, and items ordered, modifying the information from the database of the online shopping site by deleting the user's name, the credit card number, and the address, retaining the items ordered in the database of the online shopping site, wherein the information stored in the database of the online shopping site is generated by an application, the information gathering component further generating conclusions about the user, the conclusions being based on the user's interaction with the application, wherein the information gathering component gathers further information about the user by monitoring the user's interaction with the application, wherein the online shopping site includes a multi-event collector for collecting the information from the database of the online shopping site, awaiting any one of a completion of the user's transaction and an availability of network bandwidth, and transmitting the information to the information gathering component;

a profile storing component for
while the information is gathered by the information gathering component, generating a plurality of categories for storing the information,
storing the information gathered by the information gathering component as a profile of the user,
storing the conclusions generated by the information gathering component in the profile, and
storing the information in the profile in one of the plurality of categories based on classification of the information; and a security component for granting unlimited access to the profile only to the user and limited access to the profile to third parties designated by the user.

2. The personal profile data repository of claim 1, wherein the personal profile data repository is stored in the user's home.

3. The personal profile data repository of claim 1, wherein the personal profile data repository is stored in a central repository.

4. The personal profile data repository of claim 1, wherein the profile is a secure access database.

5. The personal profile data repository of claim 1, wherein the plurality of categories comprises a financial category, a family category, and an education category.

6. The personal profile data repository of claim 1, wherein granting limited access to the profile to third parties designated by the user comprises granting access to one of the plurality of categories of the profile to the third parties designated by the user.

7. The personal profile data repository of claim 1, wherein granting limited access to the profile to third parties designated by the user comprises granting limited access to the profile to third parties designated by the user for a limited time.

8. A personal profile data repository, comprising components stored on a non-transitory computer-readable medium, the personal profile data repository comprising:

an information gathering component for
gathering information about a user from a database of an online shopping site into one location including receiving the information from third parties, the information including a user's name, a credit card number, an address, and the items ordered,
modifying the information from the database of the online shopping site by deleting the user's name, the credit card number, and the address,
retaining the items ordered in the database of the online shopping site,
wherein the information stored in the database of the online shopping site is generated by an application, the information gathering component further generating conclusions about the user, the conclusions being based on the user's interaction with the application,
wherein the online shopping site includes a multi-event collector for collecting the information from the database of the online shopping site, awaiting any one of a completion of the user's transaction and an availability of network bandwidth, and transmitting the information to the information gathering component;

a profile storing component for while the information is gathered by the information gathering component, generating a plurality of categories for storing the information, classifying the information into at least one of the plurality of categories and storing the information gathered by the information gathering component into a profile of the user, wherein the information stored in the profile is arranged based on the plurality of categories, the profile storing component further storing the conclusions generated by the information gathering component in the profile; and a security component for
granting only limited access to third parties designated by the user, where the limited access is granted in a fashion determined by the user, and
granting access to a third party based on a virtual access key, wherein the virtual access key grants access only to information in a particular subset of the plurality of categories.

9. The personal profile data repository of claim 8, wherein the plurality of categories comprises a financial category, a family category, and an education category.

10. The personal profile data repository of claim 8, wherein the profile is stored in a secure access database and the security component comprises the top layer of the secure access database.

11. The personal profile data repository of claim 8, wherein the virtual access key grants access to the profile only for a limited time and the security component deletes any information about the user from a database of the third party once the limited time has expired.

12. The personal profile data repository of claim 8, wherein the personal profile data repository is physically located at a place accessible by the user.

13. The personal profile data repository of claim 9, wherein the personal profile data repository is stored in a central repository.

14. A method for using a personal profile data repository having an information gathering component, a profile storing component, and a security component, and within a communications network including at least one outside source comprising:

gathering information about a user from a database of an online shopping site including receiving the information from third parties, the information including a user's name, a credit card number, an address, and the items ordered, wherein the information stored in the database of the outside source is generated by an application, and wherein the online shopping site includes a multi-event collector for collecting the information from the application, awaiting any one of a completion of the user's transaction and an availability of network bandwidth, and transmitting the information to the information gathering component;

modifying the information from the database of the online shopping site by deleting the user's name, the credit card number, and the address;

retaining the items ordered in the database of the online shopping site;

generating conclusions about the user, the conclusions being based on the user's interaction with the application;

while the information is gathered, generating a plurality of categories for storing the information;

storing the information and the conclusions by category of the plurality of categories as a profile in a personal profile data repository fully accessible only to the user;

granting limited access to the profile to third parties designated by the user; and granting access to a third party based on a virtual access key, wherein the virtual access key grants access only to information in a particular subset of the plurality of categories.

15. The method of claim 14, wherein storing the information and the conclusions further comprises storing the profile in a location accessible by the user.

16. The method of claim 14, wherein storing the information and the conclusions further comprises storing the profile in a central repository.

17. The method of claim 14, wherein storing the information and the conclusions further comprises storing the profile in a secure access database on a computer-readable medium.

18. The method of claim 14, wherein the plurality of categories comprises a financial category, a family category, and an education category.

19. The method of claim 14, wherein the virtual access key grants access to the profile only for a limited time.

20. The method of claim 19, further comprising deleting any information about the user from a database of the third party once the limited time has expired.

* * * * *